May 29, 1923.

G. B. DOREY 1,456,974

FRICTION DRAFT RIGGING

Filed March 17, 1922

WITNESSES
R. R. Gordon
Edgar G. Dolbel

INVENTOR
Geo. B. Dorey

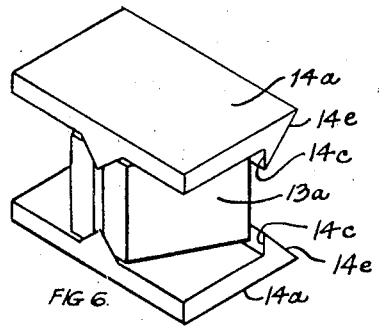
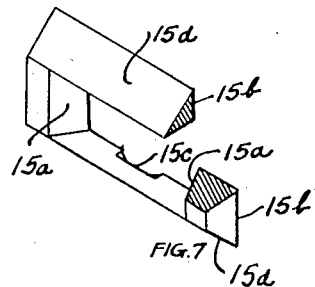
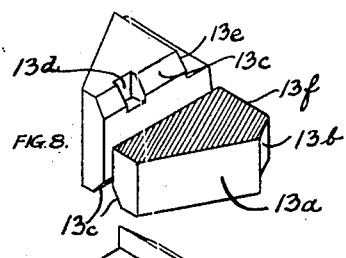
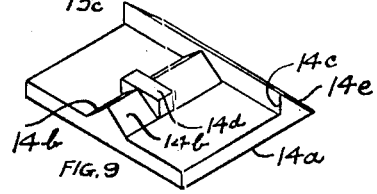
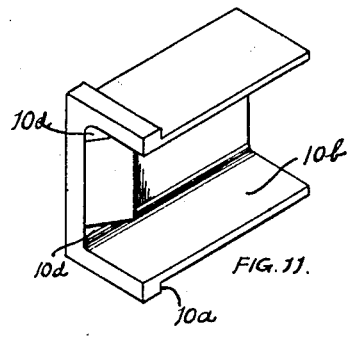
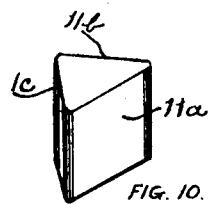
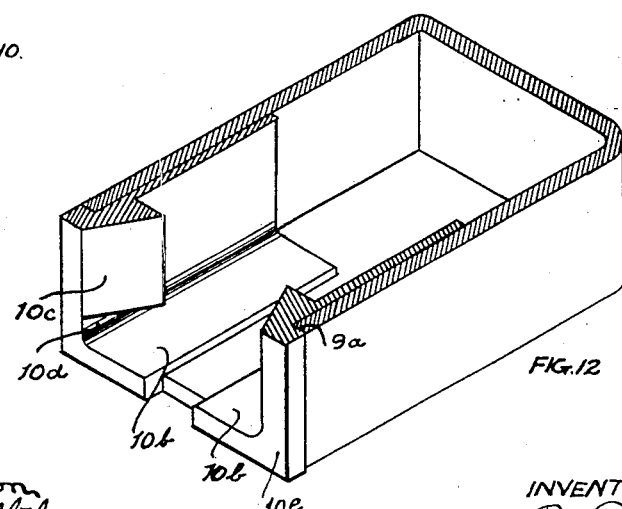

Patented May 29, 1923.

1,456,974

UNITED STATES PATENT OFFICE.

GEORGE BINET DOREY, OF MONTREAL, QUEBEC, CANADA, ASSIGNOR TO WILLIAM H. MINER, OF CHAZY, NEW YORK.

FRICTION DRAFT RIGGING.

Application filed March 17, 1922. Serial No. 544,458.

*To all whom it may concern:*

Be it known that I, GEORGE BINET DOREY, a subject of the King of Great Britain, and residing in the city of Montreal, Province of Quebec, Dominion of Canada, have invented certain new and useful Improvements in Friction Draft Riggings, and do hereby declare the following to be a full, clear, and exact description of the same.

This invention relates to improvements in friction draft riggings as applied to railway cars and the like and especially to that type wherein friction elements are associated with casings for the purpose of creating friction.

It is an object of the invention to provide expanding friction mechanism to co-act with the interior walls of a casing and to provide simple means whereby such frictional contact will be positively maintained throughout the travel of the frictional elements. It is also an object of the invention to cause such frictional elements to be displaced a greater distance and at a greater speed than the coupler thereby insuring high resistant capacity with relatively low bearing pressures between the friction elements and the casing walls.

A more specific object of the invention is to provide an expansible friction mechanism adapted to be displaced by transversely movable members, and to so dispose the various parts that both the friction mechanism and the transversely movable members will be in substantially the same plane thereby presenting the greatest possible longitudinal space for springs.

A further object of the invention is to cause the frictional members to engage the casing walls at locations where such parts are least subject to bending stresses. An inherent defect in draft riggings utilizing the walls of rectangular shaped casings as bearing surfaces for friction elements has been the liability of such elements bending and deflecting the casing walls outwardly. In this invention this defect has been overcome in the novel manner hereinafter explained.

It is also an object of the invention to facilitate the release of the gear by having the frictional mechanism so arranged that the coupler may be returned to the normal position independently of the release of the frictional mechanism.

With these ends in view and other details of novelty such as will be more particularly pointed out hereinafter my invention resides in the peculiar construction, arrangements and combination of parts set forth in this specification and claims.

For a fuller comprehension of my invention reference must be had to the accompanying drawings wherein like references indicate like parts and wherein Figure 1 shows a sectional plan view of the draft rigging as applied between the sills of a railway car.

Figure 6 is a perspective view of the resistance mechanism shown in assembly relation.

Figure 7 is a perspective view of the wedge retaining member.

Figure 8 is a perspective view of the central inwardly movable wedges, one of these being shown in section.

Figure 9 is a perspective view of one of the friction shoes.

Figure 10 is a perspective view of one of the wedge pressure transmitting members.

Figure 11 is a perspective view of one of the liners.

Figure 12 is a sectional perspective view of the casing member shown with the liners in assembly relation.

Figure 1:
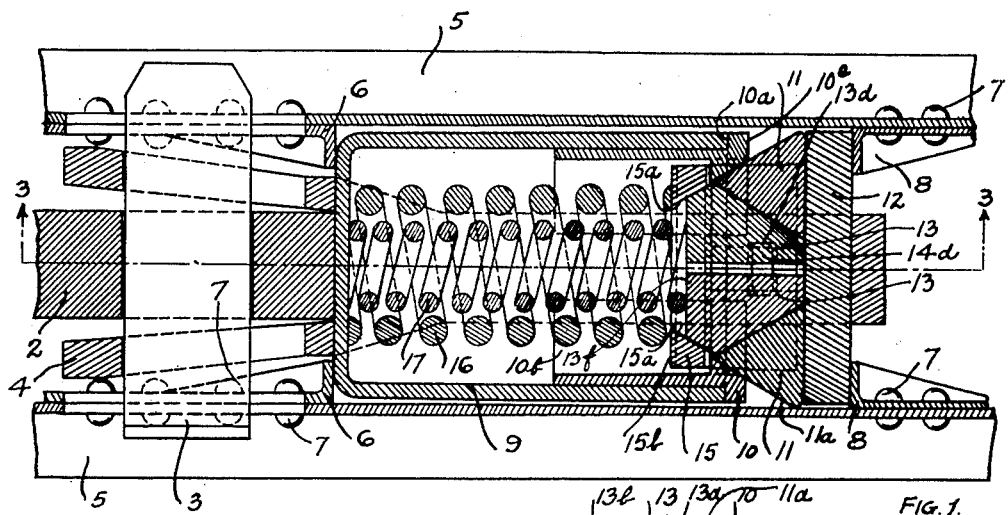

In the drawings a preferred embodiment of the invention is shown as applied between the sills of a railway car, the drawbar of the coupler 2 being connected by means of key 3 to the yoke 4 in the usual manner, the yoke embracing the draft rigging and the whole being located between the center sills 5—5. In the illustration the draft rigging is shown as abutting against front stops 6 secured to the center sills by means of rivets 7, rear stops 8 also secured to the center sills in like manner form stops under buffing strains.

The draft rigging consists of a casing 9 preferably formed of rectangular shape. The interior walls of the casing are fitted with inserts 10 which act as liners to take the wear which usually occurs on the casing walls and these are loosely mounted within the casing and preferably channel shaped. Wedge pressure transmitting members 11 are adapted to be acted upon by a follower 12 to displace friction mechanism consisting of central inwardly movable wedges 13 and outwardly movable shoes 14. An outer spring 16 is interposed between the casing end wall and the wedge retaining member 15 and the inner spring 17 is interposed between the casing end wall and the central wedges 13 directly resisting inward movement of the latter.

The casing 9 which is preferably formed of rectangular shape is provided with the liners 10 which are loosely mounted therein and have lips 10$^a$ which abut on the edge of the casing at 9$^a$. The liners have interior faces 10$^b$ adapted to register with surfaces 14$^a$ of the shoes 14. The walls 10$^b$ are spaced from each other in order to insure the casing lateral walls against bending strains in case the friction shoes should deflect under load. In order to secure the maximum strength in the casing with the least amount of metal the open space between the liners is disposed at substantially the line of greatest bending moment. The liners which are preferably made channel shaped are each provided with a beveled face at 10$^c$ with which the surfaces 11$^a$ of the pressure members are adapted to register. At each side of the said beveled faces a space is provided as at 10$^d$ to permit the passage of the shoes 14 which normally project beyond the end of the casing. The inner surfaces 11$^b$ of the pressure transmitting members 11 register with surfaces 13$^a$ of the central wedge members 13 thereby exerting a squeezing effect on these members and forcing them inwardly towards each other and longitudinally into the casing.

The central wedge members acting on the shoes to move the same in contact with the interior walls of the casing and relatively thereto provide the resistance friction mechanism of the rigging. The central wedge members are each beveled in a longitudinal direction as shown at 13$^c$ thereby presenting a V shaped longitudinal recess when the members are placed in operative relation. The wedge shaped portion of the shoes as made by surfaces 14$^b$ fit within the recess made by the inclined surfaces 13$^c$ of the central wedge members.

The central wedge members 13 have a flat portion formed on each side at 13$^e$ which engage the ledges 14$^c$ on each of the shoes thereby insuring that both the central wedge members and the shoes will move in unison during the compression cycle of the rigging. During the releasing movement of the rigging the shoes and wedge members are also caused to move in unison by having projections 14$^d$ of the shoes fitting within recesses 13$^d$ of the wedge members. The said recesses are constructed to permit a limited amount of longitudinal movement between the wedge members and shoes in order to facilitate the release of the parts. The recesses are also constructed to permit a certain amount of relative transverse movement between the shoes and central wedge members and with this end in view ample clearance is provided in the recesses to permit the shoes and central wedge members to remain in wedging engagement as wear on the shoes takes place.

The inner ends of the central wedge members are formed with tapered portions as at 13$^b$ adapted to register with similarly tapered surfaces 15$^a$ of the wedge retaining member 15. The inner face 15$^b$ of the wedge retaining member constitutes an abutment for the outer spring 16 while the inner spring 17 extends through the opening of the wedge retaining member and bears directly on the surfaces 13$^f$ of the central wedge members. The wedge retaining member is formed with a recess at 15$^c$ to accommodate the inner spring. In order to provide the maximum spring space consistent with maximum bearing area for the shoes the outer side walls of the wedge retaining member are tapered at 15$^d$ and the inner surfaces of the shoes are also tapered at 14$^e$ in a similar manner. The surface 12$^a$ of the follower 12 bears on the surface 11$^c$ of the wedge pressure transmitting members.

Figure 2:
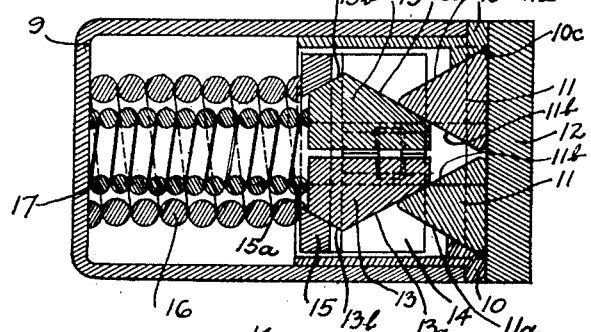
Figure 2 is a horizontal sectional view of the rigging showing the same in the fully compressed position.
Figure 3:
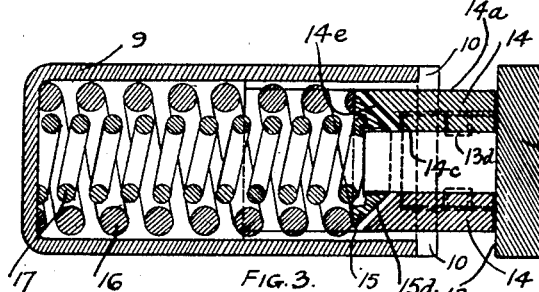
Figure 3 is a sectional elevational view of the draft rigging taken on line 3—3 of Figure 1.
Figure 4:
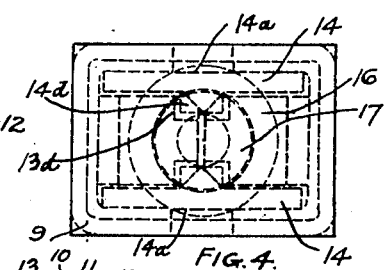
Figure 4 is an end view of the draft rigging as shown in Fig. 3.

When the gear is fully compressed as shown in Figure 2 the surface 12$^a$ of the follower abuts on surface 10$^e$ of the liners.

The operation of the gear takes place as follows. In draft or buffing strains the draft gear is compressed by relative approach of follower to casing. During such movement the wedge block pressure transmitting members 11 are moved longitudinally into the casing, and by reason of the beveled surfaces of the casing at 10$^c$ they are also moved transversely thereby exerting a squeezing upon the inclined surfaces 13$^a$ of the central wedge members. The effect of the longitudinal and transverse movement of the wedge pressure transmitting members on the central wedge members results in the latter being moved a greater distance and at a greater speed than the former. Furthermore the transverse movement of the wedge block pressure transmitting members exerts a compressive force on the central wedge members bringing the same relatively closer to each other and by reason of the inclined surfaces 13$^c$ acting on the wedge shaped surfaces 14$^b$ of the shoes forcing the latter outwardly against the casing walls. As the members 13 are moved inwardly the shoes 14 will also move in unison therewith due to the flat portion 13ᵉ bearing on the ledge 14ᵉ of the shoes. The wedging action on the central wedging members 13 is further enhanced by the wedge retaining member, which on being acted upon by the outer spring is forced tightly over the wedge shaped ends 13ᵉ of the members 13.

The disposition of the wedging surfaces in two planes provides for large bearing areas between the friction surfaces in a comparatively short length thereby providing for a very long spring.

The draft rigging being fully compressed and the follower 12 abutting on surface 10ᵃ of the casing structure the release of the rigging takes place as follows:—The inner and outer springs expand and the inner spring acting directly on the central wedge members tends to break the tight wedging contact between these members and the wedge retaining member by moving the former slightly forward and out of the engagement with the latter. The outer spring bearing on the wedge retaining member moves the entire friction mechanism in a forward direction. During such return movement any tendency of the central wedge members to move forward beyond the shoes is prevented by the engagement of projections 14ᵈ of the shoes into the recesses 13ᵈ of the central wedge members.

Figure 5:
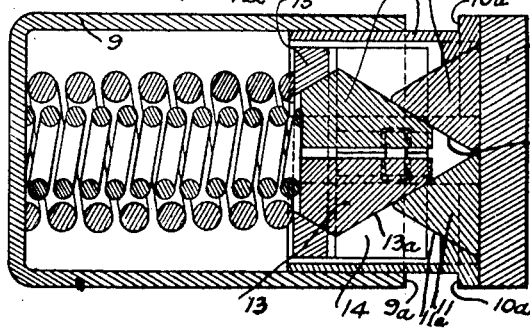
Figure 5 is a horizontal sectional view of the rigging showing the same with the springs partially expanded and the entire frictional mechanism returned to the normal release position as a unit.

In the event of the frictional adherence between the shoes and allied parts being too great to permit relative movement between the shoes and the liners provision has been made for the liners to travel outwardly with the friction mechanism in the manner shown in Figure 5. When the rigging releases in this manner it will be noted that the entire friction mechanism consisting of the follower, pressure blocks, central wedge members, friction shoes and wedge retaining member moves forward as a unit withdrawing the liners out of the casing. As the forward movement progresses there is a tendency for the liners to spring slightly in an outward direction being no longer supported by the casing at the point of greatest transverse thrust and in this manner the pressure on the wedge block pressure transmitting members is relieved. As soon as this pressure is reduced further expansion of the springs takes place forcing the wedge block pressure transmitting members transversely outwardly returning the liners inwardly into the casing and thereby placing the gear in readiness for the next compression cycle.

What I now claim is:

1. In a friction draft rigging, the combination with a casing having beveled walls of friction mechanism disposed therein, the said mechanism including friction shoes and transversely movable wedge blocks, such transverse movement operating to force the friction shoes outwardly in a direction at right angles to the movement of the wedge blocks.

2. A friction draft rigging comprising a casing having a plurality of sides angularly related to each other, transversely and longitudinally movable members in engagement with certain of the sides and adapted to maintain frictional elements in engagement with other of the sides and move the same relatively thereto in a longitudinal direction.

3. In a friction draft rigging, the combination with a drawbar having movement of a casing having a plurality of walls angularly disposed relatively to each other, pressure transmitting members in engagement with certain of the sides and adapted to maintain frictional elements in engagement with the other sides and move the said elements a greater distance than the drawbar moves.

4. A friction draft rigging comprising a casing longitudinally disposed in the line of draft and presenting a series of angularly related walls; a plurality of the said walls being inclined to the line of draft and relatively to the other walls, and pressure transmitting members in engagement with the former and adapted to maintain friction mechanism in engagement with the latter and move the same relatively thereto in a longitudinal direction.

5. In a friction draft rigging, a casing having beveled side walls, lateral walls connecting the same, transversely movable members in engagement with the side walls and friction mechanism including friction shoes adapted to be displaced by the transversely movable members, the said shoes being in frictional engagement with the lateral walls of the casing and movable relatively thereto and springs for maintaining the parts in operative relation.

6. A friction draft rigging comprising a casing having an open end, loosely mounted liners disposed therein and adapted to abut on the edge of the casing at the open end, such liners presenting oppositely disposed beveled walls, transversely movable wedge elements co-operating therewith and friction mechanism adapted to be displaced by movement of the said transversely movable wedge elements.

7. A friction draft rigging comprising a casing structure having oppositely beveled walls, wedge pressure transmitting members in engagement therewith presenting relatively approachable wedging faces adapted to act upon centrally disposed wedges to force the same transversely towards each other and inwardly into the casing, the said transverse movement being adapted to expand friction shoes outwardly against the casing walls.

8. A friction draft rigging comprising a stationary member, included friction elements co-acting therewith, such co-action being maintained by centrally disposed wedges adapted to expand the friction elements against the stationary member, the said central wedges each presenting oppositely disposed wedge shaped ends, transversely movable members acting on one end of each wedge and an integral wedge shaped movable retaining member acting on the other end thereof, spring means directly resisting inward movement of the central wedges and spring means directly resisting inward movement of the wedge retaining member.

9. A friction draft rigging comprising a casing structure presenting beveled walls, pressure transmitting members each having adjacent surfaces both inclined to the line of draft, one of such surfaces being adapted to register with one of the beveled walls of the casing, frictional mechanism composed of a plurality of wedge members each having a wedge surface inclined to the line of draft and adapted to register with the other surface of one of the pressure transmitting members; the said wedge members each having oppositely inclined surfaces forming a longitudinally extending V shaped trough when the said members are placed in operative relation, friction shoes having a wedge shaped portion adapted to register with the longitudinally disposed wedging surfaces.

10. A friction draft rigging comprising a casing presenting bevelled walls and parallel walls, transversely and longitudinally movable wedge block pressure transmitting members in engagement with the said beveled walls, friction mechanism adapted to be displaced by the said pressure transmitting members and comprising a plurality of wedge members each having oppositely disposed wedge surfaces inclined to the line of draft, one of such surfaces being acted upon by the wedge block pressure transmitting members and the other wedge surface being acted upon by an integral movable wedge retaining member, the said wedge members when placed in operative relation being adapted to exert wedging action in a plane at right angles to the line of draft and force friction shoes against the parallel walls of the casing, spring means directly resisting inward movement of the wedge retaining member and spring means directly resisting inward movement of the wedge members.

11. A friction draft rigging comprising a casing, friction elements movable transversely towards each other and means whereby such movement operates to force friction shoes outwardly in a plane at right angles to the said transverse movement and means whereby the parts are caused to move relatively to the casing in unison while permitting relative transverse and lateral movement.

In testimony whereof, I have hereunto subscribed my name in the presence of two witnesses.

GEORGE BINET DOREY.

Witnesses:
A. G. LAMONTAGUE,
EDGAR G. DOLBER.